United States Patent
Annapureddy et al.

(10) Patent No.: US 11,840,239 B2
(45) Date of Patent: Dec. 12, 2023

(54) MULTIPLE EXPOSURE EVENT DETERMINATION

(71) Applicant: NETRADYNE, INC., San Diego, CA (US)

(72) Inventors: Venkata Sreekanta Reddy Annapureddy, San Diego, CA (US); Michael Campos, San Diego, CA (US); Arvind Yedla, San Diego, CA (US); David Jonathan Julian, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 246 days.

(21) Appl. No.: 17/122,508

(22) Filed: Dec. 15, 2020

(65) Prior Publication Data

US 2021/0097855 A1 Apr. 1, 2021

Related U.S. Application Data

(63) Continuation of application No. 16/723,527, filed on Dec. 20, 2019, now Pat. No. 10,885,777, which is a (Continued)

(51) Int. Cl.
*G06K 9/00* (2022.01)
*B60W 40/04* (2006.01)
(Continued)

(52) U.S. Cl.
CPC ......... *B60W 40/04* (2013.01); *G06F 18/2431* (2023.01); *G06T 7/248* (2017.01);
(Continued)

(58) Field of Classification Search
CPC ....... G08G 1/04; G08G 1/0108; B60W 40/04; G06K 9/628; G06T 7/248; G06T 7/70; G06T 2207/30256; G06V 20/44; G06V 20/46; G06V 20/56; G06V 20/584; G06V 20/588; G06V 20/597; G06V 20/58; G06V 20/582
See application file for complete search history.

(56) References Cited

U.S. PATENT DOCUMENTS

| 5,808,728 A | 9/1998 | Uehara |
| 6,188,329 B1 | 2/2001 | Glier et al. |

(Continued)

FOREIGN PATENT DOCUMENTS

| KR | 10-2014-0080105 A | 6/2014 |
| WO | WO-2017/123665 A1 | 7/2017 |
| WO | WO-2017/165627 A1 | 9/2017 |

OTHER PUBLICATIONS

Hunter et al., "The path inference filter: model-based low-latency map matching of probe vehicle data", In: Algorithmic Foundations of Robotics X. Jun. 20, 2012, Retrieved from https://arxiv.org/pdf/1109.1996.pdf>.

(Continued)

*Primary Examiner* — Dhaval V Patel
(74) *Attorney, Agent, or Firm* — Foley & Lardner LLP

(57) ABSTRACT

Systems, devices and methods provide, implement, and use vision-based methods of sequence inference for a device affixed to a vehicle.

20 Claims, 8 Drawing Sheets

Related U.S. Application Data continuation of application No. PCT/US2018/053636, filed on Sep. 28, 2018.

(60) Provisional application No. 62/566,312, filed on Sep. 29, 2017.

(51) Int. Cl.
| | | |
|---|---|---|
| *G06T 7/246* | (2017.01) | |
| *G06T 7/70* | (2017.01) | |
| *G08G 1/01* | (2006.01) | |
| *G08G 1/04* | (2006.01) | |
| *G06V 20/58* | (2022.01) | |
| *G06V 20/56* | (2022.01) | |
| *G06V 20/40* | (2022.01) | |
| *G06F 18/2431* | (2023.01) | |
| *G06V 20/59* | (2022.01) | |

(52) U.S. Cl.
CPC ............. *G06T 7/70* (2017.01); *G06V 20/44* (2022.01); *G06V 20/46* (2022.01); *G06V 20/56* (2022.01); *G06V 20/58* (2022.01); *G06V 20/582* (2022.01); *G06V 20/584* (2022.01); *G06V 20/588* (2022.01); *G08G 1/0108* (2013.01); *G08G 1/04* (2013.01); *G06T 2207/30256* (2013.01); *G06V 20/597* (2022.01)

(56) References Cited

U.S. PATENT DOCUMENTS

| | | | |
|---|---|---|---|
| 6,281,808 B1 | 8/2001 | Glier et al. | |
| 6,768,944 B2 | 7/2004 | Breed et al. | |
| 6,985,827 B2 | 1/2006 | Williams et al. | |
| 7,254,482 B2 | 8/2007 | Kawasaki et al. | |
| 7,825,825 B2 | 11/2010 | Park | |
| 7,957,559 B2 | 6/2011 | Shima et al. | |
| 8,031,062 B2 | 10/2011 | Smith | |
| 8,144,030 B1 | 3/2012 | Lipke | |
| 8,258,982 B2 | 9/2012 | Miura | |
| 8,446,781 B1 | 5/2013 | Rajan et al. | |
| 8,531,520 B2 | 9/2013 | Stricklin et al. | |
| 8,560,164 B2 | 10/2013 | Nielsen et al. | |
| 8,645,535 B1 | 2/2014 | Martini | |
| 8,676,492 B2 | 3/2014 | Litkouhi et al. | |
| 8,773,281 B2 | 7/2014 | Ghazarian | |
| 8,855,904 B1 | 10/2014 | Templeton et al. | |
| 8,912,016 B2 | 12/2014 | Godo et al. | |
| 8,972,076 B2 | 3/2015 | Ogawa | |
| 9,047,773 B2 | 6/2015 | Chen et al. | |
| 9,081,650 B1 | 7/2015 | Brinkmann et al. | |
| 9,104,535 B1 | 8/2015 | Brinkmann et al. | |
| 9,147,353 B1 | 9/2015 | Slusar | |
| 9,158,980 B1 | 10/2015 | Ferguson et al. | |
| 9,524,269 B1 | 12/2016 | Brinkmann et al. | |
| 9,535,878 B1 | 1/2017 | Brinkmann et al. | |
| 9,558,656 B1 | 1/2017 | Brinkmann et al. | |
| 9,672,734 B1 | 6/2017 | Ratnasingam | |
| 9,676,392 B1 | 6/2017 | Brinkmann et al. | |
| 9,677,530 B2 | 6/2017 | Gibson et al. | |
| 10,004,000 B2 * | 6/2018 | Li | H04W 28/0278 |
| 10,029,696 B1 | 7/2018 | Ferguson | |
| 10,053,010 B2 | 8/2018 | Thompson et al. | |
| 10,151,840 B2 | 12/2018 | Itoh et al. | |
| 10,157,423 B1 | 12/2018 | Fields et al. | |
| 10,176,524 B1 | 1/2019 | Brandmaier et al. | |
| 10,229,461 B2 | 3/2019 | Akiva | |
| 10,347,127 B2 | 7/2019 | Droz et al. | |
| 10,407,078 B2 | 9/2019 | Ratnasingam | |
| 10,449,967 B1 | 10/2019 | Ferguson | |
| 10,475,338 B1 | 11/2019 | Noel | |
| 10,782,654 B2 | 9/2020 | Campos et al. | |
| 10,796,369 B1 | 10/2020 | Augustine et al. | |
| 10,803,525 B1 | 10/2020 | Augustine et al. | |
| 11,004,000 B1 | 5/2021 | Gutmann et al. | |
| 2002/0054210 A1 | 5/2002 | Glier et al. | |
| 2004/0054513 A1 | 3/2004 | Laird et al. | |
| 2004/0101166 A1 | 5/2004 | Williams et al. | |
| 2007/0027583 A1 | 2/2007 | Tamir et al. | |
| 2007/0193811 A1 | 8/2007 | Breed et al. | |
| 2008/0130302 A1 | 6/2008 | Watanabe | |
| 2008/0162027 A1 | 7/2008 | Murphy et al. | |
| 2009/0115632 A1 | 5/2009 | Park | |
| 2009/0265069 A1 | 10/2009 | Desbrunes | |
| 2009/0284361 A1 | 11/2009 | Boddie et al. | |
| 2010/0023296 A1 | 1/2010 | Huang et al. | |
| 2010/0033571 A1 | 2/2010 | Fujita et al. | |
| 2010/0045799 A1 | 2/2010 | Lei et al. | |
| 2010/0052883 A1 | 3/2010 | Person | |
| 2010/0073194 A1 | 3/2010 | Ghazarian | |
| 2010/0145600 A1 | 6/2010 | Son et al. | |
| 2010/0157061 A1 | 6/2010 | Katsman et al. | |
| 2010/0198491 A1 | 8/2010 | Mays | |
| 2010/0238262 A1 | 9/2010 | Kurtz et al. | |
| 2011/0071746 A1 | 3/2011 | O'Connor Gibson et al. | |
| 2011/0077028 A1 | 3/2011 | Wilkes et al. | |
| 2011/0182475 A1 | 7/2011 | Fairfield et al. | |
| 2012/0033896 A1 | 2/2012 | Barrows | |
| 2012/0056756 A1 | 3/2012 | Yester | |
| 2012/0095646 A1 | 4/2012 | Ghazarian | |
| 2012/0179358 A1 | 7/2012 | Chang et al. | |
| 2012/0194357 A1 | 8/2012 | Ciolli | |
| 2012/0288138 A1 | 11/2012 | Zeng | |
| 2013/0154854 A1 | 6/2013 | Chen et al. | |
| 2013/0338914 A1 | 12/2013 | Weiss | |
| 2013/0344859 A1 | 12/2013 | Abramson et al. | |
| 2014/0016826 A1 | 1/2014 | Fairfield et al. | |
| 2014/0032089 A1 | 1/2014 | Aoude et al. | |
| 2014/0114526 A1 * | 4/2014 | Erb | B66F 17/003 701/28 |
| 2014/0122392 A1 | 5/2014 | Nicholson et al. | |
| 2014/0236414 A1 | 8/2014 | Droz et al. | |
| 2015/0025784 A1 | 1/2015 | Kastner et al. | |
| 2015/0039175 A1 | 2/2015 | Martin et al. | |
| 2015/0039350 A1 | 2/2015 | Martin et al. | |
| 2015/0105989 A1 | 4/2015 | Lueke et al. | |
| 2015/0112504 A1 | 4/2015 | Binion et al. | |
| 2015/0170002 A1 | 6/2015 | Szegedy et al. | |
| 2015/0175168 A1 | 6/2015 | Hoye et al. | |
| 2015/0178578 A1 | 6/2015 | Hampiholi | |
| 2015/0178998 A1 | 6/2015 | Attard et al. | |
| 2015/0193885 A1 | 7/2015 | Akiva et al. | |
| 2015/0194035 A1 | 7/2015 | Akiva et al. | |
| 2015/0210274 A1 * | 7/2015 | Clarke | G05D 1/0246 382/104 |
| 2015/0222859 A1 | 8/2015 | Schweid et al. | |
| 2015/0248836 A1 | 9/2015 | Alselimi | |
| 2015/0281305 A1 | 10/2015 | Sievert et al. | |
| 2015/0293534 A1 | 10/2015 | Takamatsu | |
| 2015/0329045 A1 | 11/2015 | Harris | |
| 2015/0332590 A1 | 11/2015 | Salomonsson et al. | |
| 2015/0336547 A1 | 11/2015 | Dagan | |
| 2015/0379869 A1 | 12/2015 | Ferguson et al. | |
| 2016/0027292 A1 | 1/2016 | Kerning | |
| 2016/0035223 A1 | 2/2016 | Gutmann et al. | |
| 2016/0140438 A1 | 5/2016 | Yang et al. | |
| 2016/0150070 A1 | 5/2016 | Goren et al. | |
| 2016/0176358 A1 | 6/2016 | Raghu et al. | |
| 2016/0180707 A1 | 6/2016 | Macneille et al. | |
| 2016/0187487 A1 | 6/2016 | Itoh et al. | |
| 2016/0203719 A1 | 7/2016 | Divekar et al. | |
| 2016/0343254 A1 | 11/2016 | Rovik et al. | |
| 2016/0358477 A1 | 12/2016 | Ansari | |
| 2017/0015318 A1 | 1/2017 | Scofield et al. | |
| 2017/0021863 A1 | 1/2017 | Thompson et al. | |
| 2017/0036673 A1 | 2/2017 | Lee | |
| 2017/0080853 A1 | 3/2017 | Raghu et al. | |
| 2017/0086050 A1 | 3/2017 | Kerning et al. | |
| 2017/0097243 A1 | 4/2017 | Ricci | |
| 2017/0113665 A1 | 4/2017 | Mudalige et al. | |
| 2017/0174261 A1 | 6/2017 | Micks et al. | |
| 2017/0200061 A1 | 7/2017 | Julian et al. | |
| 2017/0200063 A1 | 7/2017 | Nariyambut Murali et al. | |

(56) References Cited

U.S. PATENT DOCUMENTS

| | | | |
|---|---|---|---|
| 2017/0206434 | A1 | 7/2017 | Nariyambut Murali et al. |
| 2017/0217430 | A1 | 8/2017 | Sherony |
| 2017/0230563 | A1* | 8/2017 | Satou .................. H04N 5/3537 |
| 2017/0243073 | A1 | 8/2017 | Raghu et al. |
| 2017/0261991 | A1 | 9/2017 | Raghu |
| 2017/0279957 | A1 | 9/2017 | Abramson et al. |
| 2017/0305434 | A1 | 10/2017 | Ratnasingam |
| 2018/0003965 | A1 | 1/2018 | O'Toole et al. |
| 2018/0017799 | A1 | 1/2018 | Ahmad et al. |
| 2018/0018869 | A1 | 1/2018 | Ahmad et al. |
| 2018/0120859 | A1 | 5/2018 | Eagelberg et al. |
| 2018/0253963 | A1 | 9/2018 | Coelho De Azevedo |
| 2018/0300567 | A1 | 10/2018 | Qin et al. |
| 2018/0321686 | A1 | 11/2018 | Kanzawa et al. |
| 2019/0005812 | A1 | 1/2019 | Matus et al. |
| 2019/0031088 | A1 | 1/2019 | Hiramatsu et al. |
| 2019/0369637 | A1 | 12/2019 | Shalev-Shwartz et al. |
| 2019/0377354 | A1 | 12/2019 | Shalev-Shwartz |

OTHER PUBLICATIONS

International Search Report issued in International Application No. PCT/US2018/053636 dated Dec. 7, 2018.

Written Opinion of the International Searching Authority issued in International Application No. PCT/US2018/053636 dated Dec. 7, 2018.

Extended European Search Report in EP Patent Application No. 18863528.8 dated Oct. 30, 2020, 9 pages.

Hou, et al., "Tube Convolutional Neural Network (T-CNN) for Action Detection in Videos," Proceedings of the IEEE International Conference on Computer Vision (ICCV), Aug. 2, 2017, pp. 5822-5831.

Extended European Search Report for EP 178737484.9 dated Jul. 1, 2019 (10 pages).

International Preliminary Report on Patentability, Ch. I, for PCT/US2017/013062 dated Mar. 30, 2017 (8 pages).

International Preliminary Report on Patentability, Ch. II, for PCT/US2017/044755 dated Sep. 30, 2018 (33 pages).

International Search Report and Written Opinion for PCT/US2017/044755 dated Oct. 17, 2017 (10 pages).

International Search Report and Written Opinion for PCT/US2017/13062 dated Mar. 30, 2017 (9 pages).

International Search Report and Written Opinion for PCT/US2018/055631 dated Jan. 4, 2019 (6 pages).

Office Action for IN 20187030012 dated May 31, 2021 (8 pages).

\* cited by examiner

MULTIPLE EXPOSURE EVENT DETERMINATION

CROSS-REFERENCE TO RELATED APPLICATION

This application is a continuation of U.S. patent application Ser. No. 16/723,527, filed Dec. 20, 2019, which is a continuation of PCT/US2018/53636, filed Sep. 28, 2018, and titled, "MULTIPLE EXPOSURE EVENT DETERMINATION", which claims the benefit of U.S. Provisional Patent Application No. 62/566,312, filed on Sep. 29, 2017, and titled, "MULTIPLE EXPOSURE EVENT DETERMINATION", all of which are incorporated by reference in their entirety.

BACKGROUND

Field

Certain aspects of the present disclosure generally relate to artificial intelligence devices and applications, and more particularly, to devices, systems and methods for determining a sequence inference, which may include detecting and/or classifying a traffic event and/or assigning a cause for traffic event, as may be used, for example, in monitoring a behavior of a driver.

Background

Driving is a complex and frequently dangerous human behavior that is slowly being taken over by machines. On any given road in the world today, the driving skill exhibited by different human drivers as well as by partially or fully automated driving systems may be highly diverse. From newly licensed teenage drivers to experienced trucking professionals, human drivers exhibit a wide range of driving proficiency. In addition, an individual human driver's performance may depend on his level of fatigue, distraction, and the like, and may decline with old age, loss of visual acuity, and the like.

Advanced Driver Assistance Systems (ADAS) and autonomous driving systems may attempt to address some of the shortcomings of human drivers. Current ADAS and autonomous driving systems, however, do not perform as well as a human driver would in many typical driving situations. For example, a machine controller may exhibit adequate skill on a typical highway but may underperform in a complex urban environment. Likewise, a machine controller may depend on sensors which may be faulty or unreliable, or which may exhibit different levels of performance depending on weather conditions, time of day, availability of computational resources, and the like.

As there may be a range of driving ability exhibited for human drivers, machine controllers, and human drivers assisted by machines, it may be desirable to monitor the behavior of drivers. In particular, it may be desirable to determine how a driver responds to certain events or whether a driver is a cause of an unsafe driving situation.

In one application, a driving behavior monitoring system could be used to determine or influence a driver's insurance premium. In another application, a driver monitoring system could be used to determine whether control of a vehicle should be returned from a computerized system to a human driver.

For current ADAS, autonomous driving, and driving monitoring systems, the detection and classification of temporally extended events remains a challenge. These challenges frustrate the utility of such systems. For example, during highway driving, an ADAS may determine that there is another car in front of the driver's car at a dangerously close distance. The detection of the close proximity of the other car may trigger a warning signal to alert the driver that he is tailgating. The capabilities of the same ADAS system, however, may not include an ability to determine that the car being tailgated had recently crossed into the driver's lane and deaccelerated quickly. If so, the cause of the tailgating event would not be fairly attributable to the driver, would not serve as an indication that the driver is distracted, overly aggressive, needs assistance, and the like.

Improved systems and methods for detecting and/or classifying temporally extended events would increase the utility of ADAS, autonomous driving, and driving monitoring systems. Accordingly, certain aspects of the present disclosure are directed to improved systems and method for determining a sequence inference. Examples of a sequence inference may include detecting and/or classifying driving events.

SUMMARY

Certain aspects of the present disclosure generally relate to providing, implementing, and using a method of sequence inference. Enabled with certain aspects of the present disclosure, intelligent driver monitoring systems may become more reliable and useful. In some embodiments, an enabled system may detect and/or classify driving events. In accordance with certain aspects of the present disclosure, a first inference and a second inference may be combined to form input data to a sequence inference engine. The input data may be a data vector of a predetermined size for which the sequence inference engine has been configured. A data vector may contain one or more entries in one or more dimensions. Examples of data vector dimensions include horizontal and vertical pixel values of a camera sensor, auditory frequency intensity values of an audio sensor, a series of position estimates from derived from an inertial sensor system and/or a global positioning system, and the like.

Certain aspects of the present disclosure provide a method of sequence inference. The method generally includes receiving first data from a sensor or sensors coupled to a vehicle; determining a first inference from the first data; receiving second data from the sensor or sensors; determining a second inference from the second data; combining the first inference and the second inference into a data vector having a predetermined size; and determining a sequence inference based on the data vector.

Certain aspects of the present disclosure provide an apparatus. The apparatus generally includes a memory unit; at least one processor coupled to the memory unit, the at least one processor configured to: receive first data from a sensor or sensors coupled to a vehicle; determine a first inference from the first data; receive second data from the sensor or sensors; determine a second inference from the second data; combine the first inference and the second inference into a data vector having a predetermined size; and determine a sequence inference based on the data vector.

Certain aspects of the present disclosure provide an apparatus. The apparatus generally includes means for receiving first data from a sensor or sensors coupled to a vehicle; means for determining a first inference from the first data; means for receiving second data from the sensor or sensors; means for determining a second inference from the second data; means for combining the first inference and the second inference into a data vector having a predetermined size; and means for determining a sequence inference based on the data vector.

Certain aspects of the present disclosure provide a non-transitory computer-readable medium having program code recorded thereon. The program code is executed by a processor and generally comprises program code to: receive first data from a sensor or sensors coupled to a vehicle; determine a first inference from the first data; receive second data from the sensor or sensors; determine a second inference from the second data; combine the first inference and the second inference into a data vector having a predetermined size; and determine a sequence inference based on the data vector.

DETAILED DESCRIPTION

Figure 1:
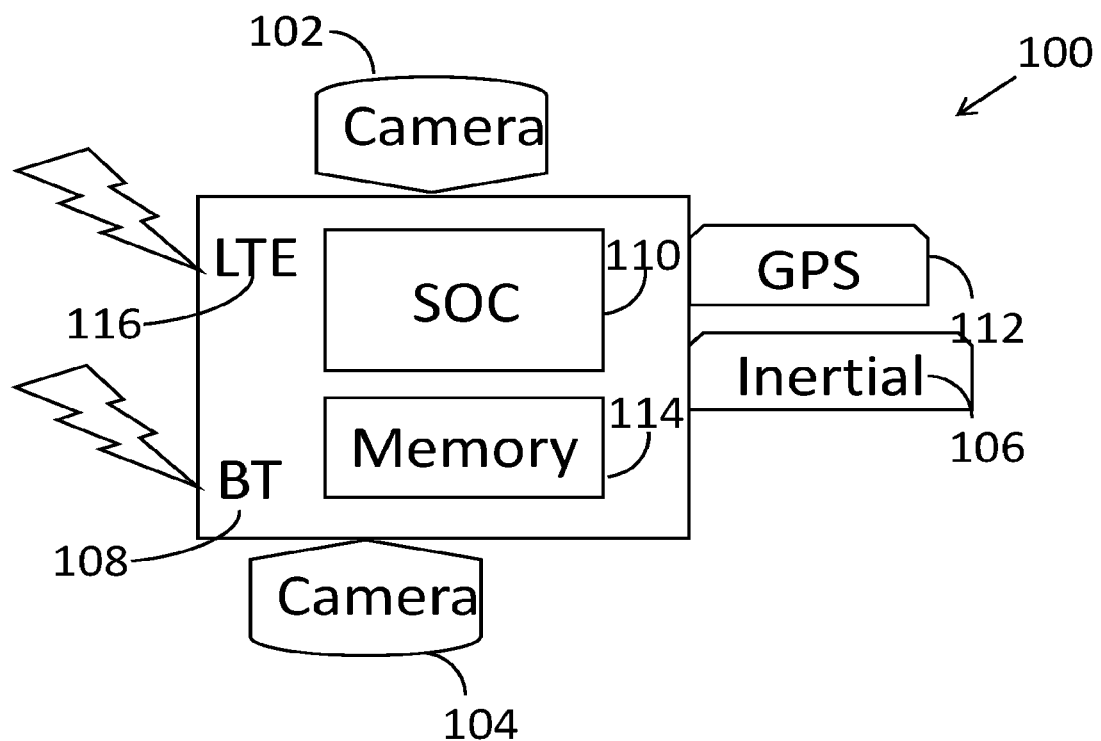
FIG. 1 illustrates an example of a device for sequence inference in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Driver Monitoring Systems

Driver monitoring systems and devices may have multiple applications. Insurance companies may desire aggregated driver behavior data to influence premiums. Insurance companies, fleet managers, and the like, may seek to reward safe driving behavior and dis-incentivize unsafe driving behaviors, for example, as a means to reducing the number of loss events across a population of drivers. Furthermore, fleet owners might desire a system capable of classifying driver behaviors as a part of a program to incentivize their drivers to drive safely and efficiently. Taxi aggregators may desire a driver monitoring system as part of a program to incentivize taxi driver behavior, and/or taxi or ride-sharing aggregator customers may desire access to past characterizations of driver behavior. With knowledge of driver behavior, customers may filter and/or select drivers based on driver behavior criteria. For example, to ensure safety, drivers of children or other vulnerable populations may be screened based on driving behavior exhibited in the past. Parents may desire to monitor the driving patterns of their kids and may further utilize methods of monitoring and characterizing driver behavior to incentivize safe driving behavior.

In addition to human drivers, machine controllers are increasingly being used to drive vehicles. Self-driving cars, for example, may include a machine controller (which may be referred to as a computerized driving controller) that interprets sensory inputs and issues control signals to the car so that the car may be driven without a human driver or with minimal human intervention. As with human drivers, machine controllers may also exhibit unsafe and/or inefficient driving behaviors. Information relating to the driving behavior of a self-driving car may be of interest to engineers attempting to improve a self-driving car's controller, to law-makers considering policies relating to self-driving cars, and to other interested parties.

Currently available driver monitoring systems may be based on sensor data available via an ODB/J1939 port. Sensor data available to a driver monitoring system may not include vision data or may record visual data along with other sensor data. For example, a driver monitoring system may lack sufficient local processing power to determine an inference based on the visual data. Such systems may rely on non-visual data to determine salient driving events. For example, driving behaviors may be detected based on sensor data observations fitting within a set of thresholds in a predetermined driving maneuver profile. Such driver monitoring systems may detect driving events based on non-visual sensors but may further include a vision sensor to capture visual data around the time of a detected event.

In one example, a driver monitoring system may process inertial sensor data to detect undesired driving behaviors. An inertial event may be an event with a detectable signature on a trace of accelerometer or gyrometer data, such a transient spike in an accelerometer trace corresponding to a sudden stop by a vehicle. As commercial-grade inertial sensors may be noisy, however, such a system may falsely detect irrelevant inertial events (which may be referred to as "false alarms") that have a similar accelerometer trace but that may not correspond to a driving event of interest. For example, running over a pothole or a speed-bump may have an accelerometer reading that is similar to that of a small collision.

To mitigate against false alarms, an inertial sensor-based system may record a video clip upon detecting an inertial event, and then the video clip may be reviewed by a human operator at a later time. Due to the involvement of the human operator, such as system may be expensive and cumbersome. In addition, while the video clip may be useful to correct false alarms, an inertial-triggered driver monitoring system may fail to notice a driving event that does not have a reliably detectable inertial signature. For example, an inertial-based system with a camera may fail to detect a driver running through a red light if the driver neither accelerated or decelerated through the red light.

Sensor Data Inferences for Event Determination

Certain aspects of the present disclosure may enable a sequence inference based on one or more sensors coupled to a vehicle. In an embodiment of certain aspects of the present disclosure, sensor data may include video data collected from a camera coupled to a vehicle. The system may determine an inference based on visual data sampled at a first time. For example, the system may determine the location of a traffic light in the visual data. The system may then determine a second inference based on sensor data sampled at a second time. For example, the system may determine that it has passed under the previously detected traffic light based on a Dedicated Short-Range Communication (DSRC) message transmitted from a beacon near the detected traffic light. In another example, the system may determine that it has passed under the previously detected traffic light based on a second determination of the location of the traffic light, such as a second vision-based determination of the location of the light relative to the vehicle-mounted camera. In these examples, the sequence inference may include a detection of a traffic light crossing event. In some embodiments, the sequence inference may include a classification of the traffic light crossing event. For example, the sequence inference may include a classification of the traffic light crossing event as a red-light crossing violation.

Inferences based on visual data may improve existing ways or enable new ways of monitoring and characterizing driver behavior. In some embodiments, visual data captured at a camera affixed to a vehicle may be used as the basis for detecting, classifying, and/or assigning a cause for a driving event. As illustrated in the previous exemplary embodiment, a driver monitoring system enabled in accordance with certain aspects of the present disclosure may detect that a driver has run a red light, even if the event could not be reliably detected from inertial sensor data and/or GPS data.

According to certain aspects of the present disclosure, a sequence inference may include determining that a traffic event involving the monitored vehicles has occurred. Several means for determining a sequence inference are contemplated, including methods based on visual data, visual data combined with other sensor modalities, or non-visual data inferences.

To determine that a driver has run a red light, for example, a first device may be configured detect an object, such as through an inference based on visual data. The object detection may include generating bounding boxes and/or object identifiers that correspond to one or more relevant objects in the scene. In a driver monitoring system, for example, it may be desirable to produce bounding boxes surrounding all or most of the visible cars, visible traffic lights, traffic signs, and the like. In addition, through the use of DSRC and other Vehicle-to-Vehicle (V2V) or Vehicle-to-Infrastructure (V2I) communications, objects may be detected and localized, even if they are not visible to a camera sensor, radar sensor, Lidar, and the like. Continuing with the example of running a red light, a first device may be configured to detect a traffic light in visual data across multiple frames, including frames in which only a portion of a traffic light may be visible in the field of view of a camera. Detecting the traffic light may include determining its location in pixel coordinates of a camera and further determining the state of the light. The event of running a red-light may then be based on a location of the detected traffic light and its state (such as green or red) in the last frame in which the traffic light was visible from the vehicle affixed camera.

Several means for detecting an event based on visual data are contemplated. In some embodiments, bounding boxes for objects may be produced by a neural network that has been trained to detect and classify objects that are relevant to driving, such as traffic lights, traffic signs, lane boundaries, road boundaries, and vehicles. In some embodiments, vehicles may be assigned to one or more of multiple classes, such as a car class and a truck class. If an image contains two cars and a traffic light, for example, a trained neural network may be used to analyze the image and produce a list of three sets of five numbers. Each set of numbers may correspond to one of the objects (one set for each of the two cars, and a third set for the traffic light). For each set, four of the five numbers may indicate the coordinates of the detected object (for example, the horizontal and vertical coordinates of a top-left corner of a bounding box surrounding the object, and a height and a width of the bounding box), and one number indicating the class to which it belonged (for example, the cars may be identified with a "1" and the traffic light may be identified with a "3").

In one example, a neural network may have been trained to detect objects based on a neural network architecture and/or training framework that has demonstrated a desired performance on an object detection benchmark, such as the PASCAL VOC 2012 dataset. PASCAL VOC refers to a Visual Object Classes challenge organized by the Pattern Analysis, Statistical modelling, and Computational Learning project of the European Union. In 2012, the challenge featured a training and validation dataset of 11,530 images containing 27,450 annotated objects from 20 classes. In this dataset, the annotations for objects were provided by human labelers, and included a bounding box and a class identifier for each object. The annotations may be considered similar to the exemplary neural network output format described above, in which a visual scene containing two cars and one traffic light may be represented with three sets of five numbers.

An aspect of the PASCAL VOC 2012 challenge invited participants to submit computer vision solutions (which may have been trained on the provided dataset) that could detect (locate and classify) objects in a separate test (evaluation) dataset. The performance of a neural network trained to perform object detection may be assessed in part, for example, by calculating an overlap between a bounding box output from a neural network (or other computer vision solution) and a bounding box provided as an annotation by a human labeler on the same image. Performance assessments could be used to compare different neural network architectures, for example. In addition, for a learning system such as a neural network, the assessments could be used as a training signal. Progress in automated methods of object detection have progressed rapidly in recent years. The availability of benchmarking datasets, such as the one featured in PASCAL VOC 2012, may have helped to drive progress in the field. For years after the PASCAL VOC 2012 competition ended, researchers continued to explore new training methods, neural network architectures, and the like, and continued to test their work and report performance on the PASCAL VOC 2012 dataset. For example, a Fast Region-based Convolutional Network (Fast R-CNN) method was introduced in 2015, which reported improvements on a measure of object detection performance on the PASCAL VOC 2012.

Returning to the present example of detecting that a vehicle ran a red light, a neural network model may be configured and trained to detect objects in a visual scene according to the Fast R-CNN method described above, or other competing methods that would be known to persons having ordinary skill in the art. For example, a neural network having an AlexNet or VGG16 architecture may be pre-trained to perform object detection, using, for example, a PASCAL or ImageNet dataset. The network may then be further trained using a custom dataset relevant to driver monitoring, which may contain images from cameras that were affixed to cars, and which may contain annotated cars, trucks, traffic lights, traffic signs, and the like. In addition, or alternatively, the dataset may contain images that do not have human annotations, which may be used for unsupervised or semi-supervised training. In some embodiments, the neural network may be configured to produce bounding boxes and class identifiers.

In some embodiments, an event detection may be based on a sequence of object detections from more than one video frame (image). In some embodiments, the object detections across multiple frames may be used to modulate the confidence associated with an object detection in any particular frame. For example, if an object is detected with high confidence in a first and a third frame, but with a lower confidence in an intervening second frame, the confidence of the object detection in the second frame may be increased based on the output of the first and third frames. Likewise, if an object is detected in the second frame, but not in surrounding first or third frames, the associated confidence might be decreased.

In addition to detecting driving events that may not be otherwise detectable, visual information may be used to classify a behavior in a context-sensitive manner. Returning to the example of running a red-light, typically, running a red light may be considered an unsafe driving behavior. In some contexts, however, such as when a traffic guard is standing at an intersection and using hand gestures to instruct a driver to move through a red light, driving through a red light would be considered a safe and/or compliant driving behavior. Additionally, in some contexts, an unsafe driving behavior, such as tailgating, may not be the fault of the driver. For example, another driver may have pulled into the driver's lane at an unsafe distance ahead of the driver. Visual information may also improve the quality of a characterization that may be based on other forms of sensor data. In one example, visual data may be used to determine a safe driving speed based on the observed speed of other drivers, as described below. Several additional examples are provided in the following sections.

Apparatus Configured for Event Determination

In accordance with certain aspects of the present disclosure, visual data from a camera sensor may be processed at a connected compute device with an inference engine. The inference engine may be a neural network model running on a graphics processor (GPU), digital signal processor (DSP), or other hardware accelerator. The neural network, alone or in combination with data-based heuristics programmed to run on an application processor, may be used to infer measurements from the visual data. For example, the neural network may be trained to detect a traffic light, where detecting a traffic light may include identifying its location in the visual field of the camera as well as its state (red, yellow, or green).

FIG. 1 illustrates an embodiment of the aforementioned devices, systems and methods for sequence inference. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a driver behavior monitoring system may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112, or integrated within a System-on-a-chip 110. The device may further include memory storage 114.

Event Detection, Event Classification, and Cause Assignment

An Intelligent Driving Monitoring System (IDMS) may monitor and report on a variety of driving events. Relevant driving events may include tailgating, speeding, traffic-light violations, weaving, swerving, and the like. In an embodiment of the present disclosure, sequence inference for each type of driving event may comprise two or more discrete steps. For example, sequence inference may comprise a first event detection step and a second event classification step. In another example, a sequence inference may include an event detection, an event classification, and a cause assignment. Other embodiments are also contemplated, including for example, sequence inference in which event detection and event classification are performed in one combined step, as described below, rather than in two discrete steps.

In the case of a traffic light violations, event detection may refer to the detection of an intersection crossing for which the intersection includes a traffic light. Event classification may refer to a classification of the intersection crossing depending on the state of the traffic light at the time of the crossing. Cause assignment may refer to whether the driver was responsible for a putative traffic light violation, which may be based, for example, on whether there was a traffic officer directing traffic at the intersection, the presence of an ambulance near the intersection, and the like.

In a typical driving scenario, a driver may cross straight through an intersection (continuing on the same road), may turn left or right at the intersection, may execute a U-turn, and so on. After detecting that a driver has driven straight through an intersection, for example, an IDMS may then classify the event into one of a predetermined number of classes. For example, the IDMS may be configured to classify a straight-through intersection crossing into one of the following four classes: 1) green-light-crossing, 2) yellow-light-crossing, 3) red-light-crossing where the light turned red after entering the intersection, and 4) red-light-crossing where the light turned red before entering the intersection. Similarly, after detecting that a driver turned left or right at an intersection, an IDMS may classify the turn as one or more of the following classes: 1) occurring when a determined amount of time available for the turn was above a predetermined threshold; 2) occurring when a determined amount of time available for the turn was below a predetermined threshold; 3) occurring in the presence of a green arrow signal; 4) occurring in the presence of a red arrow, and so on. Likewise, U-turns may be classified with respect to whether a "No U-turn" sign was posted at the intersection, and the like.

In some embodiments, a sequence inference classifier may include an additional "background" class which may indicate that a putative event detected by the event detection module is not a genuine event. Furthermore, in some embodiments, an IDMS may be configured to determine, if possible, a new class or classes to which events classified as "background" could be assigned.

Rules and Heuristics

Figure 2:
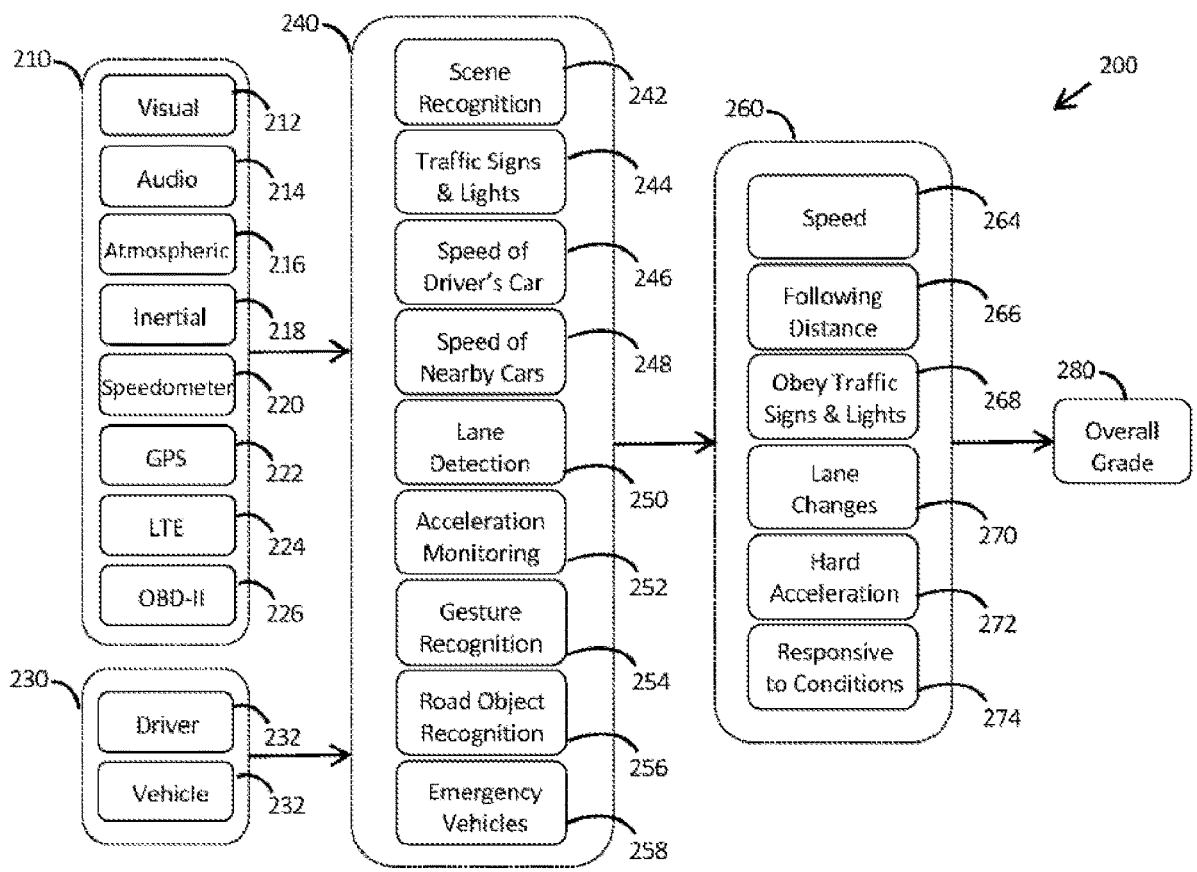
FIG. 2 illustrates an example of a sequence inference system in accordance with certain aspects of the present disclosure.

One approach to traffic light intersection detection and classification may include a set of rules and/or heuristics based on a sequence of inferences on the sensor data. Several methods of detecting and classifying events, including systems and methods for determining cause of traffic events, are described in U.S. patent application Ser. No. 15/437,646, filed 21 Feb. 2017, which is incorporated herein by reference in its entirety. FIG. 2 illustrates a system of driver monitoring in accordance with aspects of the present disclosure. The system may include sensors 210, profiles 230, sensory recognition and monitoring modules 240, assessment modules 260, and may produce an overall grade 280.

In an exemplary embodiment of the present disclosure, a traffic light violation system or method may include a set of rules regarding the state of detected traffic lights in successive images. In this example, the state of the traffic light may be determined based on an inference from visual data at a corresponding time. If a traffic light is detected in several frames, for example, one rule may classify the event based on the state of the traffic light during the last detection in the sequence. If the state of the traffic light was green at the time of the last traffic light detection, the traffic light crossing may be classified as a green-light-crossing.

Figure 3:
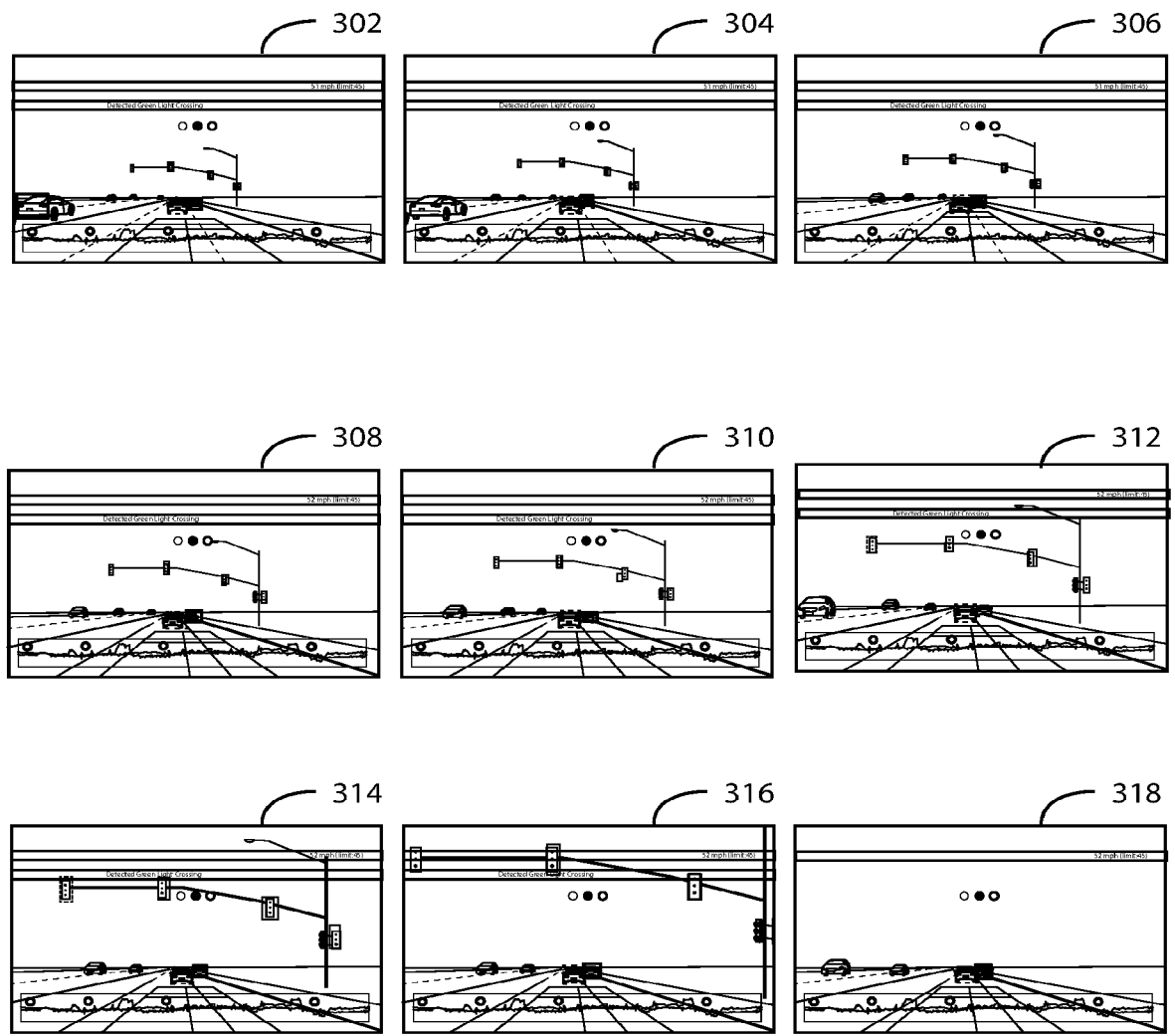
FIG. 3 illustrates an example of a sequence inference system in accordance with certain aspects of the present disclosure.

FIG. 3 illustrates a sequence of 9 image frames 302-318 corresponding to a traffic light crossing event. In this example, the driver has entered the intersection at a time corresponding to frame 316. An inference based on frame 318, which was captured after frame 316 may indicate that the previously detected traffic light is no longer present. The system may then infer, based on the separate inferences of frame 316 and frame 318, that the driver of the monitored vehicle has crossed the traffic light when it was green.

FIG. 3 further illustrates some of the challenges associated with determining a traffic light crossing. As can be seen in frames 302-316, the intersection includes two traffic lights that are illuminated green, and a third traffic light that is illuminated red. The red light in this example corresponds to a left-turn lane. While the monitored driver drove through the intersection while this third traffic light was red, this third light did not control the lane in which the monitored driver was driving.

If, unlike the situation depicted in FIG. 3, the state of the traffic light above the driver was red at the time of the last traffic light detection, the traffic light crossing may be classified as one of the red-light-crossing classes. Other sub-classifications of traffic light crossings are also contemplated, including a red-light-crossing when the light turned red (a) after the car entered the intersection or (b) before the car entered the intersection. In some embodiments of certain aspects of the present disclosure, a sequence inference may be based on a heuristic. For example, if the number of frames in which the traffic light was detected in a red state exceeds a threshold, it may be inferred that the light turned red before the car entered the intersection.

Figure 4:
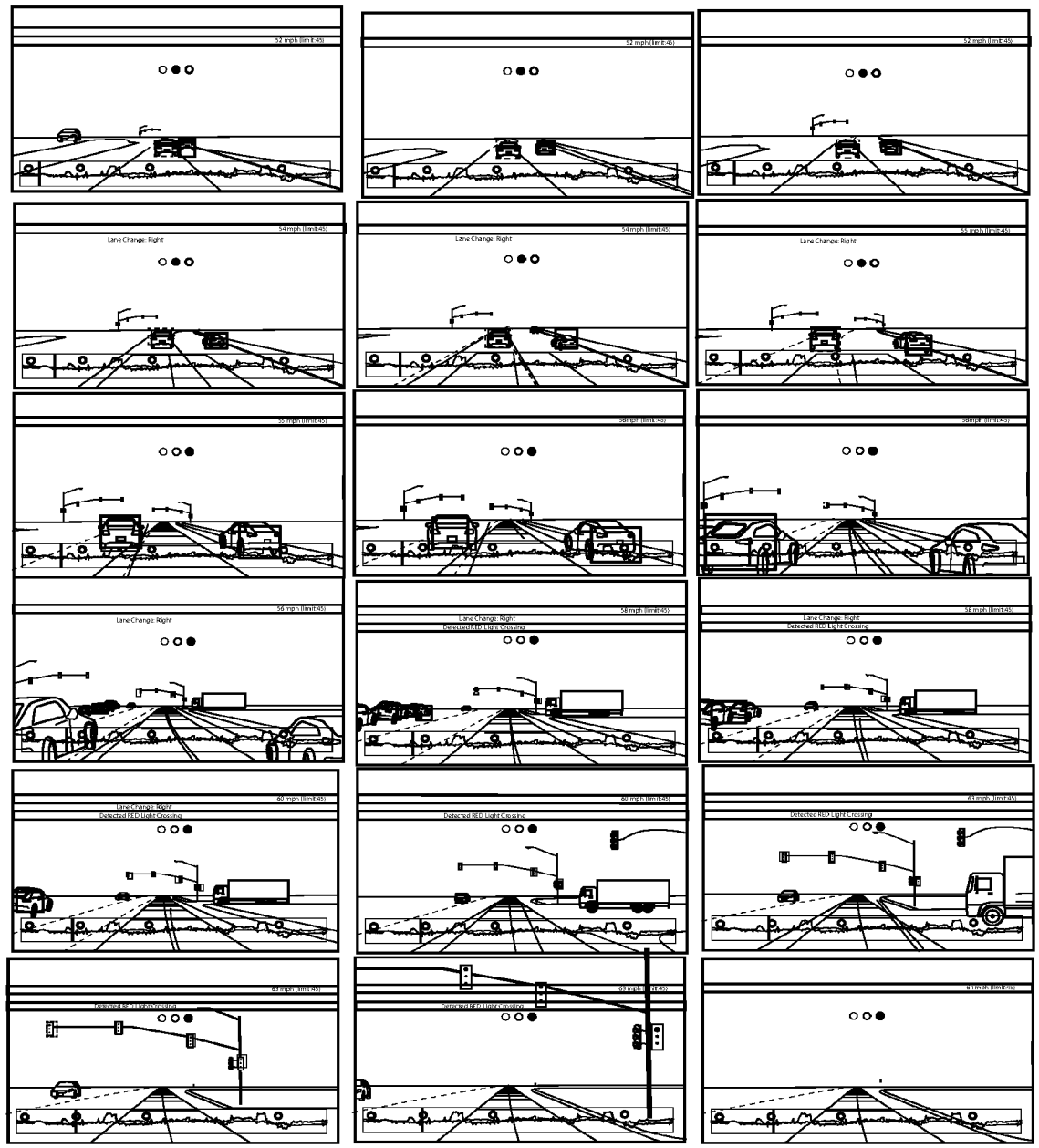
FIG. 4 illustrates an example of a sequence inference system in accordance with certain aspects of the present disclosure.

FIG. 4 illustrates visual data corresponding to a red light crossing in which the light turned red before the driver entered the intersection. In the situation illustrated in FIG. 4, the red light was visible to the driver for several frames prior to the time that the driver entered the intersection. A rule-based system may correctly classify this event based on a sequence of inferences of the traffic light location and state.

Rules and heuristics for sequence inference may evolve over time based on examples that may be observed in a deployed prototype system. Continuing with the traffic light crossing example, existing rules may trigger some false alarms. For example, an embodiment of certain aspects of the present disclosure using the rules and heuristics just described might erroneously classify a traffic light crossing as a "red-light-crossing where the light turned red before entering the intersection" (class #4 above). In reality, the car may have come to a complete stop at an intersection having a blinking red light and may have then safely crossed the intersection when it was the driver's turn to do so. An erroneous event classification may be referred to as a "false alarm".

Figure 5:
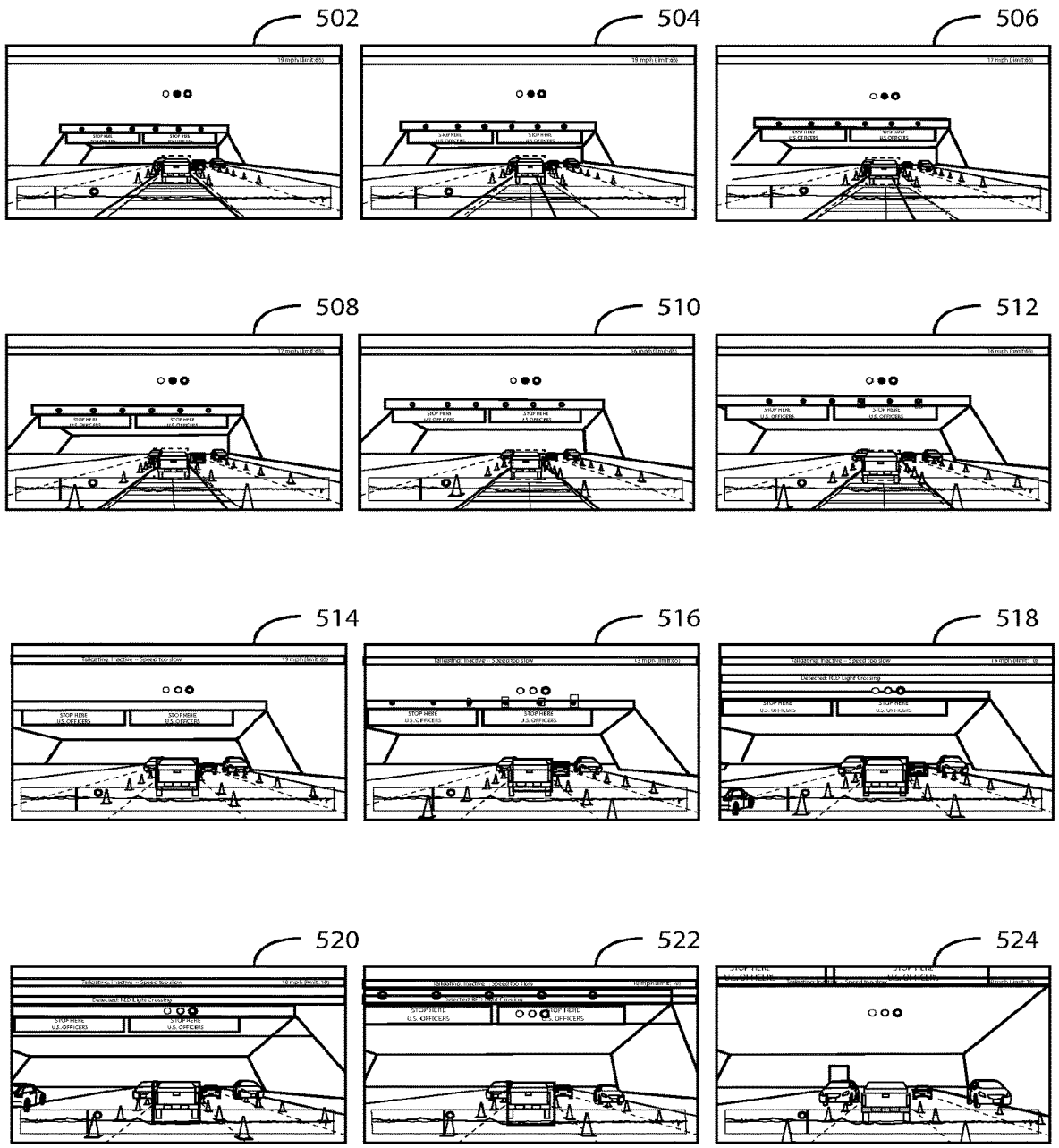
FIG. 5 illustrates an example of a sequence inference system in accordance with certain aspects of the present disclosure.

FIG. 5 illustrates visual data corresponding to a blinking red-light crossing. In this example, a series of frames 502-524 are received from a camera coupled to the monitored vehicle as the vehicle approaches a US Customs checkpoint. Each of the six lanes of the checkpoint has a traffic signals above it. All six of the traffic signals are illuminated red in frames 502 and 504. The six traffic signals are then extinguished in frame 506, illuminated in frame 508, extinguished in frame 510, illuminated in frame 512, extinguished in frame 514, and so on. A visual perception engine may process each frame to infer the state of the traffic lights. In accordance with certain aspects of the present disclosure, a sequence inference engine may take input comprising the set of inferences from the individual frames.

Returning to the exemplary heuristic described above, an event detection system may classify a traffic light crossing based on the state of a detected traffic light in the last frame that it was detected. For the night-time situation illustrated in FIG. 5, however, traffic light detection may be unreliable when no color is illuminated. The system may infer that the light was illuminated red what the monitored vehicle passed under the light, and may therefore falsely infer that the monitored driver ran a red light.

As illustrated with the previous example, a set of human-defined rules and/or heuristics may generate an unacceptable number of false alarms. A procedure for improving the precision of a traffic light crossing classification system may include an engineer observing a set of false-alarms and then devising new and/or additional rules or heuristics that may correctly classify a larger number of previously observed events, that may suppress a number of false alarms, or both.

Continuing with the example featuring a blinking red light, an engineer may devise a new rule that incorporates whether a traffic light is detected in an "off" state, meaning that none of the colored lights are illuminated. A blinking pattern could then be recognized by an alternation between a "red" state and an "off" state. A new heuristic may be devised, for example, that would ignore all intersection crossing events in which a red light is determined to be blinking. Such a heuristic may suppress false alarms at blinking red light intersections.

In crafting new rules and heuristics, the engineer may wish to exercise caution so that the new rules do not generate new types of false alarms or misclassify events that were classified correctly before the additional new rules. In addition, as the number of rules increases, there may be an increasing need to devise additional rules and heuristics to handle cases for which the application of different rules results in conflicting classifications.

Learning-Based Frameworks for Sequence Inference

Learning frameworks, such as deep neural networks, have achieved state-of-the-art performance on a wide variety of visual tasks, including object detection and classification. Relative to advances in object detection and classification, progress with regards to sequence inference, including event detection and event classification, has been tepid.

Part of the disparity between object detection or classification performance versus event detection or classification performance may be attributable to challenges relating to the application to learning frameworks to inputs of variable size. Event detection and classification often relies on inputs of variable duration. Variability in the number of data inferences that may be used in a sequence inference may pose a challenge to some kinds of inference engines.

The examples in FIGS. 3-5 illustrate the variable duration aspect that may be a typical challenge for sequence determination systems and methods. The number of visual data frames for which inferences may be relevant to the sequence inference are larger in FIG. 4 than the number of relevant frames in FIG. 3. In addition, the frequency at which visual data is sampled becomes relevant for a system that could correctly classify the driving event illustrated in FIG. 5. The availability and relevance of visual inference data may depend on a number of factors, including the speed of the driver of the monitored vehicle, the density of traffic, curvature in the road, light levels, qualities of the camera sensor, and the like. The variable duration of driving events may pose a challenge to a neural network classifier that may expect an input vector having fixed dimensions. Such an input may be referred to an a data vector.

According to certain aspects of the present disclosure, a learning-based framework may be used to address some of the challenges associated variable duration inputs. By enabling a learning-based framework, certain limitations of rules and/or heuristics-based approaches to sequence inference may be overcome. Accordingly, systems and methods of event detection, event classification, cause assignment, and the like may be improved.

Using a learning-based framework, a sequence inference engine may be shaped by training examples. With sufficient training, a system, device, or method may learn to detect and/or classify genuine events (such as genuine red-light crossing events) and suppress false-alarms (such as blinking light events). Such a learning-framework may be employed as an alternative to a rule and heuristic based system or may be used to augment such a rule and heuristic system, as described below.

In one embodiment of certain aspects of the present disclosure, a "multiple exposure" method may be used to combine inference data from single data samples. The combined inference data may then be considered input data to a sequence inference engine. Several techniques for combining inference data are contemplated, as described below. The "multiple exposure" method may effectively convert a variable duration input into an input having fixed dimensions.

A learning-based framework may include supervised learning. For supervised learning, a machine learning system, such as a deep neural network may be presented with input data for which a classification is already known. The known classification may be supplied by a previous human judgement of the data. The previous human judgements may collectively be referred to as "ground-truth" labels for the corresponding set of input data.

For the results presented in this disclosure, a learning framework was trained on a set of 500 labelled events.

Hybrid Event Detection and Event Classification System

In some embodiments of the present disclosure, a sequence inference may include an event detection module and an event classification module that operate in a sequence. The event detection module may output the likelihood that an event has occurred. When the likelihood that an event has occurred exceeds a predetermined threshold, the event may be considered detected. Subsequently, an event classifier module may classify each detected event and determine the event type.

For each detected event, an event detection module may output a timestamp indicating the occurrence of the detected event. In some embodiments, the event detection module may output values corresponding to a context time-window around the detected event. By incorporating data from a context time-window, the subsequent classification of the detected event may be made more reliable. In one example, the variable "t" may denote the timestamp associated with an event, and variables [tb, te] may denote the context time-window around the event. The classifier module may have access to the following: (1) Video frames within the context time-window; (2) GPS Location, Speed and Heading measurements within the context time-window; (3) Inertial measurements (accelerometer, gyrometer) within the context window (4) Object detections from a DNN module (along with the tracking information); (5) Lane detections from a DNN module (along with tracking information); (6) DNN feature vector for each frame in the context window.

The event classifier may receive a subset of the above information as input data. One challenge with designing the event classifier is the variable nature of the input information, as described above. For example, the number of video frames in the context window may not be constant and may vary significantly for different event instances. For example, a vehicle may go through an intersection at 50 mph vs. 10 mph. In another example, a vehicle may stop at the intersection for x seconds waiting for a red-light to turn green, and may then cross the intersection after the signal turns green. The desired length of a context time-window may be different in these cases. Also, the number of objects detected in each frame may not be constant and may vary significantly. Some classifiers such as MLPs and traditional CNNs, may only handle fixed-length inputs. Some classifiers such as RNNs (with R standing for Recurrent or Recursive) and CNNs with appropriately designed pooling layers can handle variable-length input along certain dimensions. RNNs and CNNs may be slow to train from raw sensor data, may require an infeasibly large corpus of training data, and the like.

"Multiple Exposure" Event Representation

According to certain aspects of the present disclosure, challenges associated with training an RNN and or a CNN on variable-length inputs may be overcome by training these sequence inference blocks based on inferences from an earlier inference engine, rather than from raw data. Alternatively, or in addition, variable-length inputs may be converted to an input having a pre-determined dimension. For example, the aforementioned "multiple-exposure" method may be used to combine inferences on multiple frames of visual data into a single input data vector of a predetermined size containing a superposition of the inferences.

Figure 6:
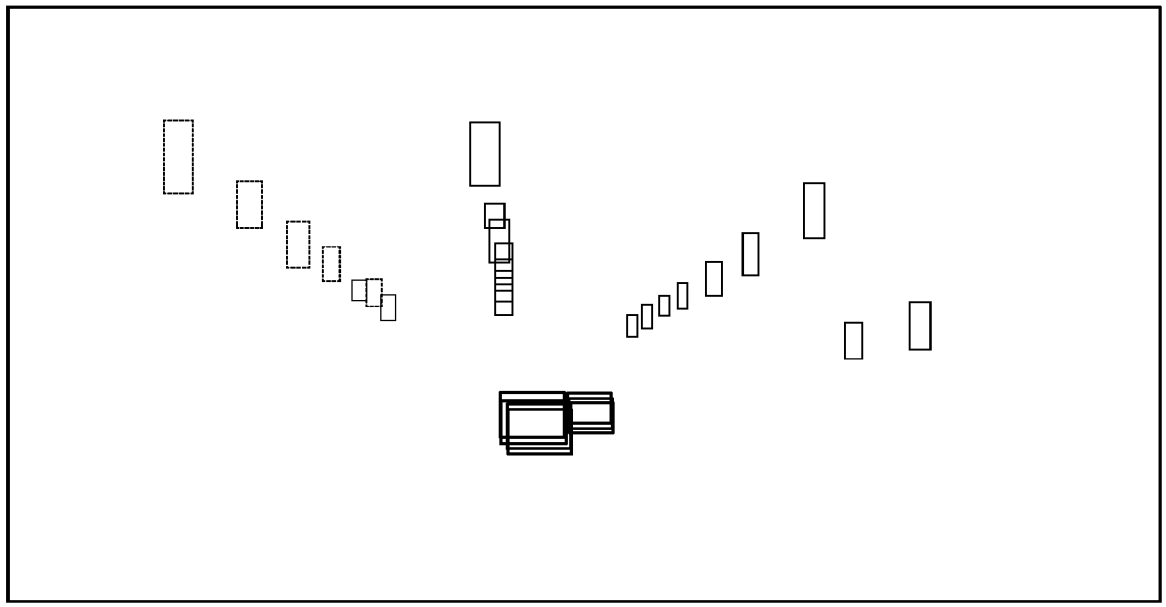
FIG. 6 illustrates an example of a sequence inference system in accordance with certain aspects of the present disclosure.

A "multiple-exposure" representation of the green-light crossing depicted in FIG. 3 is illustrated in FIG. 6. In this example, a visual inference engine has determined the locations of certain objects in the visual frame data. Traffic lights are illustrated with bounding boxes having thick lines for green lights, thin solid lines for red lights, dashed-dotted lines for traffic lights in a yellow state, and dotted lines for traffic lights in an unknown state. Accordingly, the values associated with a bounding box may indicate whether the inferred state of the traffic light was green, red, yellow, or unknown, respectively. In addition, heavy bounding boxes may indicate the size and position of detected vehicles inferred by the inference engine. FIG. 6 illustrates how these inferences over several visual frames may be superimposed together to form an input data of a predetermined size. Because the superposition of these inferences resembles the "multiple exposure" technique in photography, this representation may be referred to as a "multiple exposure" representation.

According to certain aspects of the present disclosure, the combined data illustrated in FIG. 6 may then be processed by a sequence inference engine to determine a desired feature of the event. In this example, the sequence inference engine should indicate that the driver crossed the intersection on a green light, based on the expanding pattern of green traffic light bounding boxes. The sequence inference may be informed by the nearly constant shape of the vehicle bounding boxes, which may correspond to traffic moving at nearly the same speed as the monitored driver. With the combined inferences from the multiple frames, the sequence inference engine may avoid confusion by the red light on the left.

Figure 7:
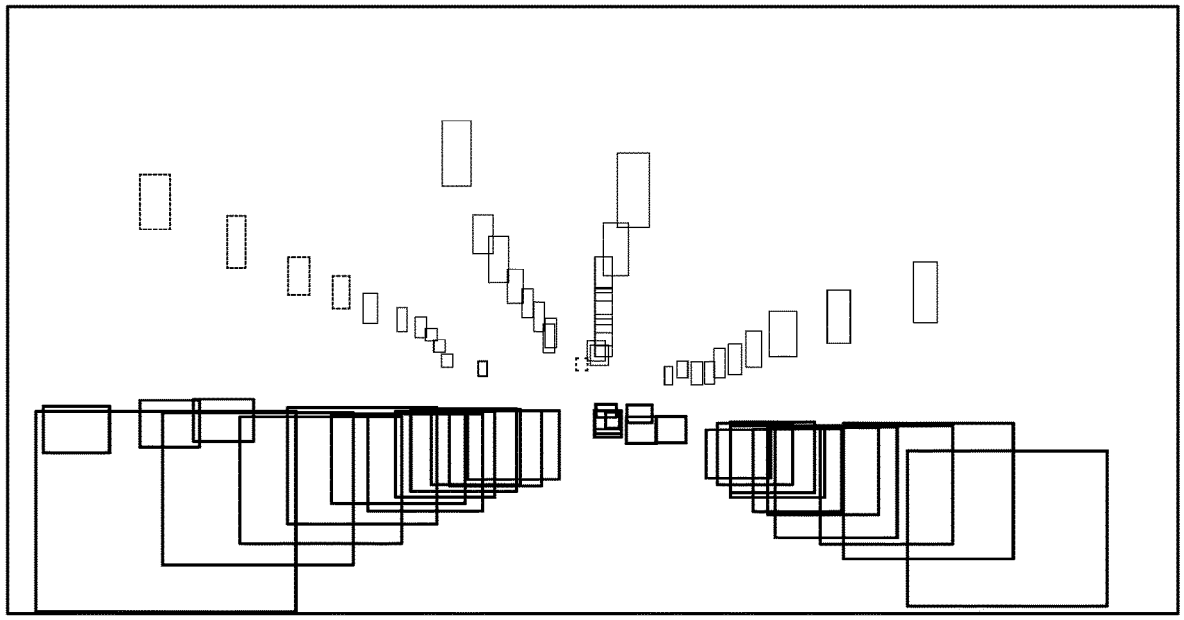
FIG. 7 illustrates an example of a sequence inference system in accordance with certain aspects of the present disclosure.

As another example, FIG. 7 illustrates the red light crossing event depicted in FIG. 4 in the "multiple-exposure" representation. In FIG. 7, the expanding size of the vehicle bounding boxes may indicate that the monitored driver is passing other vehicles on the road. In addition, the number of red traffic lights visible in the center of the frame could be used to determine that the sequence corresponds to a red-light crossing.

Figure 8:
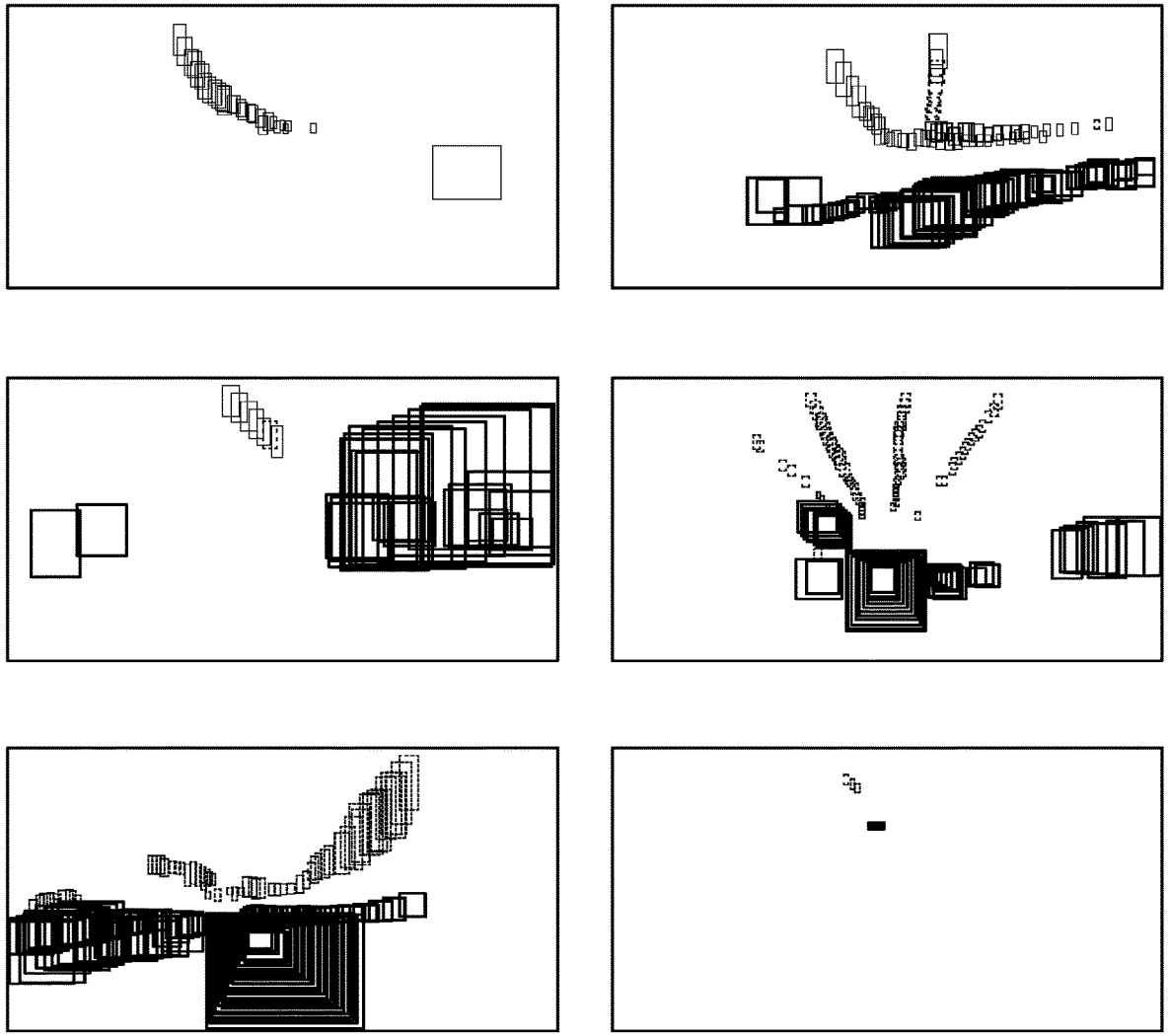
FIG. 8 illustrates an example of a sequence inference system in accordance with certain aspects of the present disclosure.

FIG. 8 illustrates six examples of the "multiple-exposure" inference data representation. All 6 of these examples correspond to traffic-light crossing events that were misclassified by a rule and heuristic based system. Example 808 corresponds to the sequence depicted in FIG. 5.

These event representations illustrated in FIG. 6, FIG. 7, and FIG. 8 were constructed by annotating the bounding boxes of objects detected by a neural network object classification engine on a blank image. For example, a blank image may contain and array of 360×640×3 pixels with the value of each pixel set to 0. The objects detected in each frame within a determined context window are then superimposed on the blank image. In these examples, the pixels corresponding to the bounding boxes set to a color value indicating the detected object and its state. In this example, the later determined bounding boxes over-write any earlier written bounding boxes. Other methods are also contemplated. For example, a later determined bounding box may be only over-write pixels that are (0,0,0), and may ignore pixels that were already written by an earlier determined bounding box.

In these examples, the following objects were annotated: Cars and trucks annotated with bounding boxes having heavy lines. Green traffic lights annotated with bounding boxes having thick lines. Yellow traffic lights annotated with bounding boxes having dashed-dotted lines. Red traffic lights annotated with bounding boxes having thin lines. Other (or unknown state) traffic lights annotated with bounding boxes having dotted lines.

The visual inference engine may also detect other types of object categories (stop-signs, pedestrians, and the like). Depending on the desired sequence inference, some object categories may be ignored and not included in the combined input data. For some inferences, the exclusion of inferences about some types of objects may improve the performance of the sequence inference. The improvement may result from less clutter in the combined data, for example.

While the above example described a three-channel input, other input formats are also contemplated. For example, different objects may be assigned to different input channels. Whereas a typical image has three color channels (Red, Green, Blue), for the purpose of sequence inference, these "color" channels may be assigned different semantic meanings. For example, all cars may be assigned to the first channel, all detected lanes may be assigned to the second channel, and so on. Accordingly, the input data vector to the sequence inference engine may have more than three channels.

In some embodiments, the frame indices of detected objects may be ignored. Still, in some embodiments, the frame indices (or some other indicator of relative timing of inferences) may be included in the input data vector. Even when frame indices are ignored, traffic-light crossing events may still be classified correctly based on the pattern of superimposed bounding boxes from sequentially detected objects.

One advantage of the "multiple exposure" method is that a fixed-input CNN classifier may be used since the input to the classifier is an inference data "image" of constant size. The inference data "image" remains constant size irrespective of the length of the context time-window, the number of objects detected in each frame, and the like. Furthermore, while the inferences may be based on the outputs of multiple sensors, it may also be applied to inferences based on a single sensor, such as a single vehicle-mounted camera. As such, the "multiple exposure" technique may obviate the need for other sensors, such as GPS, odometer, and the like. It may also obviate certain processing steps, such as object tracking, which may be computationally expensive and/or unreliable.

One hyper-parameter in this representation method is the resolution of the summary data "image". While inference and annotation may be performed based on 1920×1080 pixel images, a smaller resolution (320×180) data "image" may be used for sequence inference. By using a smaller image size, the classifier may have a relatively lower computational complexity. This change may be enabled by using data inferences rather than raw data. Furthermore, by reducing the number of parameters in the sequence inference neural network, the classifier may be less prone to overfitting to the training data.

Hybrid and End-to-End Systems and Methods

In accordance with certain aspects of the present disclosure, a hybrid system comprising a rule and heuristics based event detection module and a learning-based event classification module may be used together. Other hybrid systems are also contemplated. For example, event detection may be based on a trained neural network model, a heuristics-based event classification module may classify events, and the like.

A heuristics-based event detection module may comprise an object classification engine, which may be a neural network. For example, an intersection-crossing detection module may comprise a neural network trained to detect the presence of traffic lights. A heuristic may then be configured such that the module indicates that an intersection-crossing has been detected whenever a traffic light is detected. A second heuristic may require that a traffic light be detected in a certain number of frames in a short time interval. This second heuristic may reduce a number of false alarms rooted in false alarms of the underlying traffic light detection engine. A third heuristic may incorporate GPS data in conjunction with a previously determined map database to determine if the direction of travel corresponded to known intersection location.

Referring again to FIG. 2, in one configuration, a visual system 212 and grading systems 260 and 280 may be trained end-to-end. Rather than training the visual system for cars 248, pedestrians, lanes 250, distances, and so forth, and then a system on top to match grading scores 260, the system may be trained end-to-end such that grading scores 260 are computed directly from sensory data 210. Still, the training procedure may start with training certain subsystems 240 independently, and then performing full end-to-end training on a combination of subsystems 240 and sensory inputs 210, such as by back propagation. This training procedure may result in the detection of more finely tuned visual features which may be the basis for more accurate driver assessment scores 260.

In some embodiments of certain aspects of the present disclosure, a driving behavior may be classified directly based at least in part on visual data from the camera. This configuration contrasts with some exemplary embodiments described above that may first detect a visual object and determine a descriptor of the visual object in a first step, and then determine a sequence inference at a later step. Instead, in some embodiments, the step of determining a descriptor may be skipped. For example, a camera may be affixed to a vehicle, and a device may be attached to the camera through a shared memory, a wired connection, a wireless connection such as Bluetooth, and the like. The first device may receive visual data from the camera and may then directly classify a driving behavior based on the visual data and an inference engine.

The inference engine in this example may be a neural network that was trained in an end-to-end fashion. The inference engine may compute a classification directly from visual sensor data and may further include as an input other sensor data. For example, an end-to-end inference engine may take raw inertial sensor data as an input, may take calibrated inertial sensor data as an input, or may take processed sensor data, such as location estimates from a GPS module. Accordingly, the system or device may determine the classification of the driving behavior at the same device that received visual data from the camera. The classification data may then be transmitted to a second device, where it may then be used for a variety of applications, including driver monitoring.

In comparison to a system that may split the classification of a driving behavior across more than one inference engine, and system having an end-to-end inference engine may be considered to have some advantages and some disadvantages.

A split system may achieve a desired classification performance based on less training data in comparison an end-to-end system. For example, a split system may include separate modules, each of which may detect objects or events relating on one aspect of driving behavior. For example, one module may detect other cars or trucks on the road, while a second module may detect traffic lights. In some embodiments, these two modules may share some common processing steps, such as a common trunk of a deep learning network. Each of these modules may be trained with a number of examples covering a variety of relevant objects that might be encountered. For example, a car and truck detecting inference engine may be trained on labeled car and truck data.

In contrast, an end-to-end system may be considered to achieve a desired classification performance after it may reliably classify driving behavior as safe or unsafe. Relevant training data (such as sensor data corresponding to unsafe driving scenarios) may be less frequently encountered in comparison to, for example, visual data containing other cars or trucks. For this reason, an end-to-end inference engine may be more challenging to train.

In comparison to a split system, an end-to-end system may transmit less data. This may be desirable, for example, if there are many systems in accordance with the present disclosure deployed by an operator, such as a fleet manager. The additional data from a split system, however, may have additional utility. For example, while it may be used for monitoring driver behaviors, the descriptors of objects transmitted from a deployed split-system may more readily be used for additional purposes. For example, the additional data may be used to compute typical patterns of observations and may thereby identify an occurrence a rare event for which a classifier has not yet been trained.

Considering the trade-offs between split and end-to-end inference engines, it may be desirable to employ a split inference engine when relevant training data is scarce, and then gradually adopt a more end-to-end inference engine as the availability of training data increases.

Unsupervised and Reinforcement Learning

In addition to, or instead of, matching human labeled driver assessment scores, unsupervised and reinforcement learning may be used to lessen or avoid laborious human labeling. These approaches may help create a driver monitoring system that is robust in cases in which human labeled assessments may be in conflict with each other. Examples of such cases include swerving to avoid obstacles in the road, passing a construction stop sign that is not supposed to be active, or following a traffic officer's directions over road signage.

In one configuration, hand coded rules could be used to determine initial training values for initializing a system. The system may then be further trained and updated using reinforcement learning.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a flash drive, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method comprising:
receiving, by a computer, video data from a camera on a vehicle;
detecting, by the computer, at least one object in a plurality of frames of the video data;
generating, by the computer, a bounding box corresponding to each of the at least one object in each of the plurality of frames in which the at least one object appears;
determining, by the computer, an inference for each bounding box in each of the plurality of frames;
superpositioning, by the computer, each bounding box with each inference in each of the plurality of frames so that the inference for each bounding box in each of the plurality of frames appears; and
identifying, by the computer, a sequence based on superpositioning each bounding box with each inference in each of the plurality of frames, where a traffic event is determined from the sequence of inferences.

2. The computer-implemented method according to claim 1, further comprising generating, by the computer, a data vector based on superpositioning the inference for each bounding box in each of the plurality of frames.

3. The computer-implemented method according to claim 2, wherein the data vector has a predetermined size.

4. The computer-implemented method according to claim 2, wherein identifying the sequence comprises inputting, by the computer, the data vector into a neural network.

5. The computer-implemented method according to claim 2, further comprising detecting, by the computer, an event based on the sequence.

6. The computer-implemented method according to claim 2, further comprising determining, by the computer, a likelihood that an event has occurred based on the sequence.

7. The computer-implemented method according to claim 1, further comprising identifying, by the computer, a pattern based on the sequence.

8. The computer-implemented method according to claim 7, wherein the pattern indicates that the vehicle passed another vehicle.

9. The computer-implemented method according to claim 7, wherein the pattern indicates that traffic is moving at nearly the same speed as the vehicle.

10. The computer-implemented method according to claim 1, wherein a first inference for a first bounding box in a first frame of the plurality of frames comprises a first relative position between the vehicle and a second vehicle, and wherein a second inference for a second bounding box in a second frame of the plurality of frames comprises a second relative position between the vehicle and the second vehicle.

11. The computer-implemented method according to claim 1, wherein generating the bounding box comprises identifying, by the computer, a corner coordinate, height, and width for the bounding box surrounding the object.

12. The computer-implemented method according to claim 1, further comprising annotating, by the computer, the object corresponding to each bounding box.

13. The computer-implemented method according to claim 12, wherein annotating comprises detecting, by the computer, a class of the object using a neural network.

14. The computer-implemented method according to claim 1, wherein a first inference for a first bounding box comprises a relative position between a traffic control device and the vehicle.

15. The computer-implemented method according to claim 14, wherein the traffic control device is a traffic light, and wherein a second inference of a first bounding box comprises an estimate of an illuminated color of the traffic light.

16. A system comprising:
a non-transitory computer-readable medium storing instructions; and
a processor configured to execute the instructions to:
receive video data from a camera on a vehicle;
detect at least one object in a plurality of frames of the video data;
generate a bounding box corresponding to each of the at least one object in each of the plurality of frames in which the at least one object appears;
determine an inference for each bounding box in each of the plurality of frames;
superposition each bounding box with each inference in each of the plurality of frames so that the inference for each bounding box in each of the plurality of frames appears; and
identify a sequence based on superpositioning each bounding box with each inference in each of the plurality of frames, where a traffic event is determined from the sequence of inferences.

17. The system according to claim 16, wherein the processor is further executed to execute instructions to generate a data vector based on superpositioning the inference for each bounding box in each of the plurality of frames.

18. The system according to claim 16, wherein the processor is further executed to execute instructions to input the data vector into a neural network.

19. The system according to claim 16, wherein the processor is further executed to execute instructions to determine a likelihood that an event has occurred based on the sequence.

20. The system according to claim 16, wherein the processor is further executed to execute instructions to identify a pattern based on the sequence.

* * * * *